United States Patent Office 2,987,490
Patented June 6, 1961

2,987,490
SURFACE-ACTIVE ESTERS OF POLYMERIZED POLYETHENOID FATTY ACIDS
Willard H. Kirkpatrick, Sugar Land, and Virgil L. Seale, Alice Walker and Joe B. Love, Houston, Tex., assignors to Visco Products Company, Houston, Tex., a corporation of Delaware
No Drawing. Filed Sept. 17, 1956, Ser. No. 610,410
11 Claims. (Cl. 260—19)

This invention in general relates to new compositions of matter useful in the treatment of emulsions of mineral oil and water, such as petroleum emulsions commonly encountered in the production, handling and refining of crude mineral oil for the purpose of separating the oil from the water.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially, resulting from any one or more of numerous operations encountered in various industries. The emulsions obtained from producing wells and from the bottom of crude oil storage tanks are commonly referred to as "cut oil," "emulsified oil," "bottom settlings" and "B.S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

One object of our invention is to provide surface-active compounds useful in resolving emulsions of the character referred to into their component parts of oil and water or brine.

Another object is to provide novel reagents which are interfacial and surface-active in order to enable their use as demulsifiers or for such uses where surface-active characteristics are necessary or desirable.

The treating agents employed in accordance with the present invention comprise compositions of high molecular weight, a minimum of about 1500, which compositions are esters of (a) trimers of polyethenoid high molecular weight fatty acids, principally trimers of $C_{18}$ polyethenoid fatty acids, i.e., linoleic and/or linolenic acids, and (b) hydroxy organic compositions having a molecular weight of at least about 400. The trimer acids are essentially polymers made by polymerizing unsaturated fatty acids containing at least two nonconjugated double bonds. A suitable trimer acid is Emery 3055–S polymerized fatty acid made from primarily linoleic acid and some linolenic acid. Emery 3055–S polymerized fatty acid is primarily a $C_{54}$ tribasic acid with a minor amount of $C_{36}$ dibasic acid being present. It has a high viscosity and dark color. Typical characteristics of the Emery trimer acids are:

| | |
|---|---|
| Acid value | 183–188 |
| Saponification value | 192–198 |
| Color | Dark |
| Neutralization equivalent | 299–306 |
| Refractive index at 60° C. | 1.4830 |
| Specific gravity at 29° C. | 0.959 |
| Flash point °F | 595 |
| Fire point °F | 680 |
| Trimer content percent | 70–75 |
| Dimer content do | 20–35 |
| Pour point °F | 55 |

The polymer acid is partially soluble in mineral spirits and soluble in alcohol ketones and ethers. The tribasic acid has a molecular weight of approximately 836.

As aforesaid, the hydroxy organic compositions which are reacted with the trimer acid, alone or in admixture with other polycarboxylic acids, should have a molecular weight of at least about 400. The composition may be monohydric or polyhydric. Included among the hydroxy organic compositions are polyols such as polyoxyalkylene glycols, e.g., polyoxyethylene glycol, polyoxypropylene glycol and mixed polyols made from polyoxyethylene and polyoxypropylene. Other polyols may be made by reacting ethylene oxide and/or propylene oxide with amines or polyhydric compositions such as glycerol, pentaerythritol, mannitol, etc. Still other hydroxy compositions are prepared by attaching the hydroxy containing radical to various nuclei such as by oxyethylating and/or oxypropylating hydroxy fatty acid esters, epoxy fatty acid esters, phenol formaldehyde resins, substituted rosin materials, simple alcohols, alkylated phenols, etc. Examples of hydroxy fatty acid esters are methyl ricinoleate and caster oil which is essentially glyceryl tri-ricinoleate (85–87% ricinoleic acid).

Oxyalkylation of castor oil or methyl ricinoleate is effected by reacting ethylene oxide and/or propylene oxide with castor oil or methyl ricinoleate. Oxyalkylation with a mixture of ethylene and propylene oxide gives a product with the oxyethylene and oxypropylene groups occurring in a random or heteric manner. Satisfactory products can also be made in which oxide addition is carried out in a sequential manner so that the ethylene and propylene oxide residues would occur in an orderly manner throughout the molecular structure of the composition. In this so-called sequential type of product it is preferred that the propylene oxide molecules be adjacent to the castor oil molecules and the ethylene oxide molecules be terminally located; that is to say, the ethylene oxide residues would be removed from the castor oil molecule by the intervening propylene oxide residues. For matters of convenience and practicality our preferred procedure involves mixing the oxides prior to the oxyalkylation reaction. The preferred ratio of ethylene oxide to propylene oxide is from 1 to 1 to 10 to 1 by weight. The intermediate oxide adducts should have a minimum molecular weight of 1500 and maximum molecular weight of 3600.

The temperature employed is subject to variation, but ordinarily a temperature of about 160° C. is employed initially, and after the reaction starts the temperature may vary within the range of about 130 to 200° C. The pressures employed are also subject to variation but are usually within the range of 30 to 100 pounds per square inch gauge. Oxyalkylation of epoxy fatty acid esters follows the same general procedure.

Other embodiments of hydroxy organic compositions having a molecular weight in excess of 400 are oxyethylated organic-solvent-soluble phenol formaldehyde condensation products of a monoalkyl phenol, the alkyl group having between 5 and 15 carbons inclusive. Dialkyl phenols are not suitable for purposes of this invention but amounts up to 25% dialkyl phenol in the monoalkyl phenol may be tolerated. The weight ratio of ethylene oxide to phenol formaldehyde condensation production will, for most applications, fall between about 2.5:1 and 1:2.5, respectively.

The phenol formaldehyde condensation products are prepared by reacting formaldehyde or a substance which breaks down to formaldehyde under the reaction conditions, e.g., paraformaldehyde and trioxane, and a monoalkyl phenol, preferably crude alkylated phenol for economic reasons, by heating the reactants in the presence of a small amount of an acid catalyst such as sulfamic acid. The aqueous distillate which begins to form is collected and removed from the reaction mixture. After several hours of heating at temperatures slightly above the boiling point of water, the mass becomes viscous and is permitted to cool to about 100 to 105° C. At this point a suitable hydrocarbon fraction is added, and heating is resumed. Further aqueous distillate begins to form and heating is continued for an additional number of hours until at least about one mol of aqueous distillate per mol of reactants has been secured. The product is permitted to cool to yield the phenol formaldehyde condensation product in a hydrocarbon solvent. The molecular weight of these intermediate condensation products cannot be ascertained with certainty, but we would approximate that they contain about 3 to 15 phenolic nuclei per resin molecule. The solubility of the condensation product in hydrocarbon solvent would indicate that the resin is a linear type polymer, thus distinguishing them from the more common phenol formaldehyde resins of the cross-linked type.

Having prepared the intermediate phenol formaldehyde products, the next step is oxyalkylation of said condensation products. This is achieved by mixing the intermediate condensation product in a hydrocarbon solvent with a small amount of sodium hydroxide in an autoclave. The condensation product is heated above 100° C., and alkylene oxide is charged into the autoclave until the pressure is in the vicinity of 75 to 100 p.s.i. The reaction mixture is gradually heated until an exothermic reaction begins. The external heating is then removed, and alkylene oxide is added at such a rate that the temperature is maintained between about 150–160° C. in a pressure range of 80 to 100 p.s.i. After all of the alkylene oxide has been added, the temperature is maintained for an additional 10 to 20 minutes to assure substantially complete reaction. The resulting product is the alkylene oxide adduct of an alkyl phenol formaldehyde condensation product, in which the ratio of the oxide to the condensation product is above 1:2.5, respectively. Unsubstituted phenolformaldehyde condensation products may also be employed.

The esters of the trimerized acid are prepared by heating under agitation a hydroxy organic composition and the trimerized fatty acid with a relatively small amount of suitable hydrocarbon extract. Heating is continued until an aqueous distillate begins to form. After sufficient distillate is collected to indicate that the esterification is substantially complete, the product is cooled and is added to a suitable hydrocarbon carrier. The esterification is preferably carried out at a temperature of 200–300° C. for a period of time sufficiently long to eliminate the theoretical quantity of water produced by the esterification, plus any free water or water of hydration in the reacting chemicals. It is contemplated that the compositions of this invention shall include partially esterified trimer fatty acids and fully esterified trimer fatty acids. Hence, the composition shall include esters wherein 1–3 of the carboxyl groups of the trimerized fatty acids are esterified with hydroxy organic compositions having a molecular weight of at least 400.

The following examples are provided as illustrations of specific embodiments of the invention in which the quantities are stated in parts by weight unless otherwise indicated.

EXAMPLE I

In a three-necked reaction flask provided with means of mechanical stirring and return condenser system permitting the removal of any aqueous phase formed in the course of reaction, there is added 150 parts by weight of a trimerized fatty acid, identified as Emery 3305-S, 150 parts of a polyethylene glycol having a molecular weight of 400, and 50 parts of a suitable hydrocarbon extract. The reaction mass is heated with agitation, and at 200° C. an aqueous distillate begins to form. After 90 minutes of heating at a maximum temperature of 270° C., a total of 8.5 parts of an aqueous distillate has been secured. The product is cooled, and 257 parts of a suitable hydrocarbon fraction is added to yield a polyethylene glycol, trimeric fatty acid ester in a hydrocarbon carrier.

EXAMPLE II

In a manner similar to Example I, 100 parts of Emery trimeric fatty acid, 100 parts of a suitable hydrocarbon extract and 900 parts of an oxyalkylated phenol formaldehyde resin are heated to eliminate 3.2 parts of aqueous distillate at a maximum temperature of 263° C. to yield an ester of a trimeric fatty acid and an alkylated phenol formaldehyde resin.

The intermediate resin of the oxyalkylated phenol formaldehyde resin was prepared by reacting one mole phenol with one mole formaldehyde at temperatures rising to 200° C. The intermediate so prepared was then oxyalkylated with a 50–50 mixture of ethylene and propylene oxide in the ratio of four pounds of oxide to one pound resin, to yield a material having a molecular weight as determined by the hydroxyl value of approximately 1400.

EXAMPLE III

In a manner similar to Example I, 90 parts of Emery trimeric fatty acid, 150 parts of a 10 mole ethylene oxide adduct of an alkylated phenol residue, and 50 parts of a suitable hydrocarbon extract are heated to eliminate 2.3 parts of an aqueous distillate at a maximum temperature of 250° C. The product is cooled, and 173 parts of a hydrocarbon fraction is then added to yield an ester of a trimeric fatty acid and an oxyethylated alkylated phenol in a hydrocarbon carrier.

EXAMPLE IV

In a manner similar to Example I, 250 parts of a polyoxyalkylene triol, having a molecular weight of approximately 2400, resulting from the reaction of a mixture of equal weights of ethylene oxide and propylene oxide with glycerine, 30 parts of Emery trimeric fatty acid, and 50 parts of a suitable hydrocarbon fraction are heated to eliminate 0.7 part of an aqueous distillate. To 50 parts of the above intermediate there is added 55 parts of a hydrocarbon fraction to yield an ester of a trimeric fatty acid and a polyoxyalkylene triol in a hydrocarbon carrier.

EXAMPLE V

In a manner similar to Example I, 840 parts of Emery trimeric fatty acid, 800 parts of a 5 mole ethylene oxide adduct of tridecyl alcohol and 250 parts of a suitable hydrocarbon are heated to eliminate 36 parts of an aqueous distillate, requiring a maximum temperature of 245° C. Then 300 parts of a suitable hydrocarbon fraction are added to yield an ester of oxyethylated tridecyl alcohol and a trimeric fatty acid in a hydrocarbon carrier.

EXAMPLE VI

In a manner similar to Example I, 840 parts of Emery trimeric fatty acid, 2000 parts of a polypropylene glycol having a molecular weight of 2000, and 400 parts of a suitable hydrocarbon fraction are added to yield an ester of polypropylene glycol having a molecular weight of 2000 and a trimeric fatty acid in a hydrocarbon carrier.

EXAMPLE VII

In a manner similar to Example I, 280 parts of Emery trimeric fatty acid, 1320 parts of a 30 mole ethylene oxide adduct of castor oil, and 300 parts of a suitable hydrocarbon fraction are reacted until 18 parts of aqueous distillate have been secured at temperature of 260° C. An additional 100 parts of a suitable hydrocarbon extract are added to yield an ester of an oxyethylated castor oil and a trimeric fatty acid in a hydrocarbon carrier.

EXAMPLE VIII

In a manner similar to Example I, 140 parts of Emery trimeric fatty acid, 1000 parts of a 15 mole ethylene oxide adduct of technical grade dehydroabietylamine (Rosin Amine D, Hercules Powder Company) and 200 parts of a suitable hydrocarbon fraction are heated to secure 9 parts of an aqueous distillate at a maximum temperature of 258° C. An additional 300 parts of a suitable hydrocarbon fraction are added to yield an ester of oxyethylated Rosin Amine D and a trimeric fatty acid in a hydrocarbon carrier. For a complete description of dehydroabietylamine, see Hercules booklet, Rosin Amine D and Its Derivatives (1952 edition).

EXAMPLE IX

In a manner similar to Example I, 420 parts of Emery trimeric fatty acid, 500 parts of a tertiary polyoxyethylene amine having a molecular weight of 1000, and 200 parts of a suitable hydrocarbon fraction are heated to eliminate 9 parts of an aqueous distillate at a maximum temperature of 260° C. An additional 100 parts of a suitable hydrocarbon fraction are added to yield an ester of polyoxyethylene amine and a trimeric fatty acid in a hydrocarbon carrier.

EXAMPLE X

In a manner similar to Example I, 840 parts of Emery trimeric fatty acid, 800 parts of a three-mole ethylene oxide adduct of methyl ricinoleate and 200 parts of a hydrocarbon extract are heated to eliminate 36 parts of an aqueous distillate at a maximum temperature of 260° C. An additional 300 parts of a suitable hydrocarbon fraction is then added to yield an ester of oxyethylated methyl ricinoleate and a trimeric fatty acid in a hydrocarbon carrier.

EXAMPLE XI

In a manner similar to Example I, 600 parts of a polyoxyalkylene glycol, prepared by adding terminally 4 moles ethylene oxide to a polypropylene glycol having a molecular weight of 2000, 600 parts of a polyoxyalkylene triol prepared by adding a mixture of 2 parts propylene oxide and 1 part ethylene oxide to glycerine until a molecular weight of 2400 is secured, 420 parts of Emery trimeric fatty acid and 400 parts of a suitable hydrocarbon fraction are reacted until 18 parts of aqueous distillate has been secured at a maximum temperature of 250° C. An additional 200 parts of a suitable hydrocarbon fraction are added to yield an ester of trimeric fatty acid and mixed polyols in a hydrocarbon carrier.

EXAMPLE XII

In a manner similar to Example I, 150 parts of a 30 mole ethylene oxide adduct of castor oil, 15 parts of diglycolic acid, 40 parts of Emery trimeric acid and 50 parts of a suitable hydrocarbon extract are reacted to secure 3.6 parts of an aqueous distillate at a maximum temperature of 248° C. An additional 250 parts of a hydrocarbon fraction are added to yield the mixed ester of a hydroxy ethylated castor oil with diglycolic acid and a trimeric fatty acid in a hydrocarbon carrier.

EXAMPLE XIII

In a manner similar to Example I, 65 parts of a trimeric fatty acid and 470 parts of an oxyalkylated phenol formaldehyde resin were heated to eliminate 1.5 parts of an aqueous distillate at a maximum temperature of 268° C. To this reaction product, after cooling, there was added 427 parts of a suitable hydrocarbon extract to yield an ester of Emery trimeric fatty acid and an oxyalkylated phenol formaldehyde resin in a hydrocarbon carrier.

The intermediate resin of the oxyalkylated phenol formaldehyde resin was prepared by reacting 4 moles of phenol with three moles of formaldehyde at a maximum temperature of 200° C. The intermediate so prepared was then oxyalkylated with a 50/50 mixture by weight of ethylene and propylene oxides in a ratio of four pounds of oxide to one pound of resin to yield a material having a hydroxyl value of approximately 1400.

EXAMPLE XIV

In a manner similar to Example I, 100 parts of Emery trimeric fatty acid and 450 parts of the intermediate resin as described in Example II were heated to eliminate 2.4 parts of aqueous distillate at a maximum temperature of 265° C. After cooling, there was added 452 parts of a suitable hydrocarbon extract to yield an ester of a trimeric fatty acid and an oxyalkylated phenol formaldehyde resin in a hydrocarbon carrier.

EXAMPLE XV

In a manner similar to Example I, 100 parts of Emery trimeric fatty acid and 950 parts of an oxyalkylated phenol formaldehyde resin were heated to eliminate 3 parts of aqueous distillate at a maximum temperature of 255° C. For every 100 parts of this product there was added, after cooling, 79 parts of a suitable hydrocarbon fraction to yield an ester of a trimeric fatty acid and an oxyalkyated phenol formaldehyde resin in a hydrocarbon carrier.

The intermediate resin of the oxyalkylated phenol formaldehyde resin was prepared by reacting one mole of phenol with one mole of formaldehyde at a maximum temperature of 200° C. The intermediate so prepared was then oxyalkylated with a 50/50 mixture by weight of ethylene and propylene oxides in the ratio of two pounds of oxide to one pound of resin to yield a material having an hydroxyl value of approximately 900.

EXAMPLE XVI

In a manner similar to Example I, 200 parts of Emery trimeric acid and 950 parts of an oxyalkylated phenol formaldehyde resin as described in Example XV were heated to eliminate 6.7 parts of an aqueous distillate at a maximum temperature of 278° C. To each 100 parts of this product there is added 82 parts of a suitable hydrocarbon extract to yield an ester of a trimeric fatty acid and an oxyalkylated phenol formaldehyde resin in a hydrocarbon carrier.

By way of illustrating the effectiveness of the product contemplated by this invention, the method of testing the efficiency of the compositions of Examples XIII–XVI will be described and exemplary data given. Samples of 35 gravity crude oil from the W. B. Thornton lease, Hastings Field, Texas, were obtained from the Stanolind Oil Company. One hundred cc. samples of the crude oil emulsion containing about 45% water were taken and placed in conventional test bottles. The treating chemicals of Examples XIII–XVI were added at a ratio of .08 part of a 10% solution of chemical to 100 parts emulsion fluid. After the test chemical was added, the samples were placed in the test bottles and were shaken 150 times at atmospheric temperature and subsequently agitated an additional 50 times at 135° F. At the end of a five-minute period after cold shaking, and at 15 and 30 minute intervals after the hot shaking, the water drop (the amount of water that separated from the emulsion) was determined and recorded. The color of the oil was also observed and recorded at the same time before and after agitation at the elevated temperature. The results of the tests are tabulated in the following table.

*Table I*

| Composition | Water Drop, cc. | | | Excess Grind Out, cc. $H_2O$ | Color [1] | |
|---|---|---|---|---|---|---|
| | 5 min. cold | 15 min. hot | 30 min. hot | | Before hot shakes | 30 min. after hot shakes |
| Ex. XIII | 38 | 38 | 39 | 1.0 | B | G– |
| Ex. XIV | 39 | 38 | 38 | 1.4 | B | G– |
| Ex. XV | 39 | 38 | 41 | 0.1 | GB+ | G |
| Ex. XVI | 39 | 37 | 39 | 0.8 | GB | G |

[1] G—green; GB—greenish brown; B—brown.

Examples of suitable hydrocarbon vehicles are $SO_2$ extract, toluene, xylene, gas oil, diesel fuel, bunker fuel and coal tar solvents. SO$_2$ extract is a by-product from the Edeleanu process of refining petroleum in which the undesirable fractions are removed by extraction with liquid sulfur dioxide. The above cited examples of solvents are adaptable to azeotropic distillation as would be also any other solvent which is immiscible with water, miscible with the reacting mass and has a boiling point or boiling range in excess of the boiling point of water.

The invention is hereby claimed as follows:

1. An ester having a molecular weight of at least 1500, said ester formed by the esterification of (a) a polymerized polyethenoid fatty acid mixture consisting of at least 70% trimerized fatty acid, the trimerized acid having a molecular weight of at least 834 and being a tricarboxy acid, with the remainder of said mixture being a dicarboxy dimer of the polyethenoid fatty acid in said trimerized fatty acid, and (b) a polyoxyalkylene organic compound having an esterifiable hydroxy group in the polyoxyalkylene chain, said polyoxyalkylene compound having a molecular weight of at least 400 and the alkylene groups in the polyoxyalkylene portion of the polyoxyalkylene compound having 2–3 carbons.

2. An ester having a minimum molecular weight of at least 1500, said ester formed by the esterification of (a) a mixture of a dicarboxy dimer of a C$_{18}$ polyethenoid fatty acid and a tricarboxy trimer of a C$_{18}$ polyethenoid fatty acid, at least 70% of said mixture being said trimer with the remainder of said mixture being said dimer, and (b) a polyoxyalkylene organic compound having an esterifiable hydroxy group in the polyoxyalkylene chain, said polyoxyalkylene compound having a molecular weight of at least 400 and the alkylene groups in the polyoxyalkylene portion of the polyoxyalkylene compound having 2–3 carbons.

3. An ester as claimed in claim 1 wherein said polyoxyalkylene compound is a polyoxyalkylene polyol having a molecular weight of at least 400 and wherein the alkylene groups in the polyoxyalkylene portion of said polyol contain 2–3 carbons.

4. An ester as claimed in claim 2 wherein said polyoxyalkylene compound is a polyoxyalkylene glycol having a molecular weight of at least 400 and wherein the alkylene groups in the polyoxyalkylene portion of said glycol contain 2–3 carbons.

5. An ester as claimed in claim 2 wherein said polyoxyalkylene compound is a polyoxyalkylene triol having a molecular weight of at least 400 and wherein the alkylene groups in the polyoxyalkylene portion of said triol contain 2–3 carbons.

6. An ester as claimed in claim 2 wherein said polyoxyalkylene compound is a polyoxyalkylated aliphatic amine having a molecular weight of at least 400.

7. An ester as claimed in claim 2 wherein said polyoxyalkylene compound is a polyoxyalkylated ester of a hydroxy fatty acid having a molecular weight of at least 400 and wherein the alkylene groups in the polyoxyalkylene portion of said polyoxyalkylated ester contain 2–3 carbons.

8. An ester as claimed in claim 2 wherein said polyoxyalkylene compound is a polyoxyalkylated castor oil having a molecular weight of at least 400 and wherein the alkylene groups in the polyoxyalkylene portion of said polyoxyalkylated castor oil contain 2–3 carbons.

9. An ester as claimed in claim 2 wherein said polyoxyalkylene compound is a polyoxyalkylated aliphatic alcohol having a molecular weight of at least 400 and wherein the alkylene groups in the polyoxyalkylene portion of said polyoxyalkylated aliphatic alcohol contain 2–3 carbons.

10. An ester as claimed in claim 2 wherein said polyoxyalkylene compound is a polyoxyalkylated phenol-formaldehyde condensation product, which product is soluble in an organic hydrocarbon solvent prior to polyoxyalkylation, having a molecular weight of at least 400 and wherein the alkylene groups in the polyoxyalkylene portion of said polyoxyalkylated phenol-formaldehyde condensation product contain 2–3 carbons.

11. An ester as claimed in claim 10 wherein the polyoxyalkylene groups in said polyoxyalkylated phenol-formaldehyde condensation product consist of both oxyethylene and oxypropylene groups.

References Cited in the file of this patent

UNITED STATES PATENTS

| | | |
|---|---|---|
| 2,322,494 | Wirtel et al. | June 22, 1943 |
| 2,413,613 | Eckey et al. | Dec. 31, 1946 |
| 2,429,219 | Cowan et al. | Oct. 21, 1947 |
| 2,454,544 | Bock et al. | Nov. 23, 1948 |
| 2,473,798 | Kienle et al. | June 21, 1949 |
| 2,541,993 | De Groote et al. | Feb. 20, 1951 |
| 2,581,371 | De Groote et al. | Jan. 8, 1952 |
| 2,597,204 | Todd et al. | May 20, 1952 |
| 2,610,955 | De Groote et al. | Sept. 16, 1952 |
| 2,695,883 | Smith | Nov. 30, 1954 |
| 2,712,535 | Fisch | July 5, 1955 |
| 2,785,978 | Gracht | Mar. 19, 1957 |

OTHER REFERENCES

Cowan et al.: "Synthetic Oils from Residual Dimerized Fat Acids," pages 153–157, Oil and Soap, August 1943.